May 19, 1959 N. HORWOOD 2,886,944
HYDRAULIC DRIVE TRANSMISSION
Filed Feb. 3, 1956
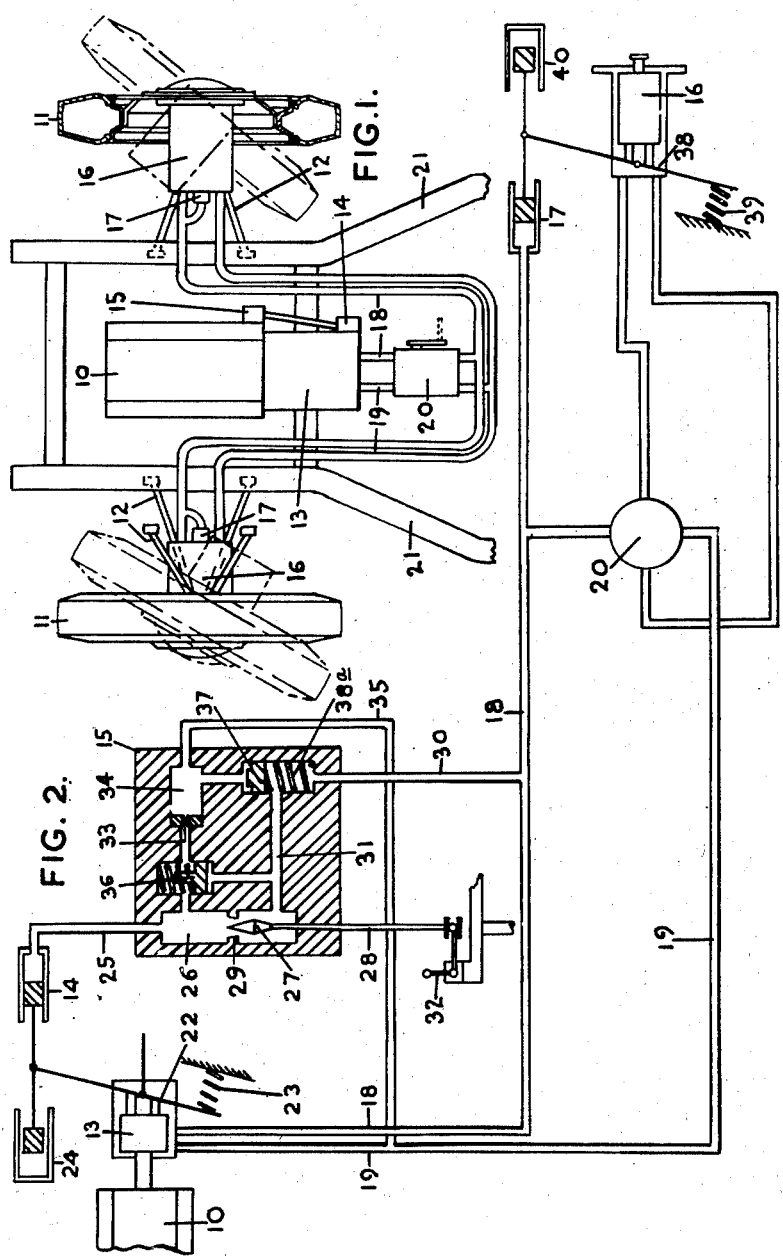
Inventor
Norman Horwood
By: Scrivener and Parker
attorneys United States Patent Office 2,886,944
Patented May 19, 1959

2,886,944

HYDRAULIC DRIVE TRANSMISSION

Norman Horwood, Edgbaston, Birmingham, England, assignor to The Austin Motor Company Limited, Birmingham, England Application February 3, 1956, Serial No. 563,375

Claims priority, application Great Britain March 25, 1955

3 Claims. (Cl. 60—19)

This invention relates to a hydraulic drive transmission, particularly suitable for vehicles and the like, of the variable capacity pump and variable capacity motor type providing a continuously variable ratio of transmission between limits, and comprising an engine-driven pump driving one or more motors.

The object of the present invention is to provide increased efficiency in a hydraulic transmission of this type.

The engine-driven pump and the motor or motors could be either of the piston type using a swash plate or an eccentric as the piston abutment or of other types having capacity adjustment mechanism, and in investigations into the characteristics of a certain swash plate type pump driven by a certain internal combustion engine, it was observed that to produce, for example, a pressure of 1000 lbs. per square inch over a range of pump speeds from 500 r.p.m. to 2500 r.p.m., the swash plate angle at 500 r.p.m. was 9.5 degrees; had to be increased, at a decreasing rate, up to 10.6 degrees at 1000 r.p.m. and was kept substantially constant up to 1200 r.p.m., but thereafter needed to be decreased, at an increasing rate, to 10.4 degrees at 1400 r.p.m., and thereafter needed to be decreased substantially uniformly to 10 degrees at 1600 r.p.m.; 9.6 degrees at 1800 r.p.m.; 9.1 degrees at 2000 r.p.m. and 7.6 degrees at 2500 r.p.m., all as demanded by the characteristics of the horse power/r.p.m. curve of the engine.

Plotting these results graphically, it is found that the swash plate angle is the same, viz. 9.5 degrees, to deliver 1000 lbs. per square inch at both 500 r.p.m. and approximately 1860 r.p.m., and at any swash plate angle between the limits 9.5 to 10.6 degrees, this phenomenon of two different pump r.p.m. values giving the same pressure occurs.

The same phenomena occurred for approximately the same speed range, viz. 500–1860 r.p.m. over a wide pressure range, viz. 500–1000 lbs. per square inch, and the present invention concerns an apparatus for setting the pump capacity in accordance with these findings, for more efficient operation of the pump and an associated motor or motors driven thereby.

According to the present invention, in a hydraulic drive transmission of the type referred to, the capacity adjustment mechanism of the engine-driven pump is actuated by a pressure-responsive servo-cylinder for adjustment of said mechanism to determine pump capacity, in the sense that increased servo-cylinder pressure reduces pump capacity, and pressure fluid admitted to said servo-cylinder as a tapping from pump delivery is metered by a valve directly responsive to engine speed, the valve being characterized in that, during its travel from one end limit of its stroke to the other, the valve aperture area decreases to a minimum and then increases, so that, at different positions of the valve in its travel, the same valve aperture area occurs and the pump capacity adjustment mechanism is affected accordingly, the arrangement being such that said mechanism is automatically positioned at or near the predetermined setting thereof giving maximum efficiency for pressure conditions prevailing in the transmission.

In a further feature of the invention a further valve for over-riding the servo-pressure metering valve, and preferably housed in the same valve housing as the latter, controls the metering fluid outlet duct, said valve being operated by excessive pump delivery pressure to close said outlet duct and thereby effect an intensification of servo pressure and consequent reduction of pump capacity.

In a still further feature of the invention as applied to a transmission for a motor vehicle, variable capacity motors, mounted to drive whichever wheels it may be considered necessary to drive, are provided with capacity adjustment mechanisms which are actuated automatically in opposite sense to that of the pump, each by a servo-cylinder subjected directly to pump delivery pressure obtaining in the vicinity of the motor with which it is associated.

In this latter connection, and in a still further feature of the invention, a third valve, preferably housed in the same valve housing as the metering valve of the pump, is capable of blocking the tapping from pump delivery to cut off supply to the metering valve, being a valve which is subjected at one side to the pressure prevailing at the low pressure side and being operated, against spring loading and the pressure prevailing in said tapping from pump delivery, by pressure build-up in the low pressure side of the system due to over-running and the resulting tendency for the motors to act as pumps, to allow said pressure to build-up in the pump servo-cylinder so as to effect an actuation of the pump adjustment mechanism in the sense to reduce the pump capacity and enhance the braking effect of the pump.

An embodiment of the invention as applied to a motor vehicle transmission, in which the engine drives a swash plate pump which transmits the drive hydraulically to swash plate motors mounted to drive the steerable front road wheels of the vehicle, will now be described with reference to the accompanying drawings; in which:

Fig. 1 is a plan view of the front portion of a vehicle chassis and showing the hydraulic drive transmission between the engine and the steerable front wheels.

Fig. 2 is a diagrammatic view of the hydraulic drive transmission and including, for the sake of simplification, only one of the swash plate motors and associated capacity adjustment mechanism.

Referring to the drawings, and more particularly to Fig. 1, 10 is the vehicle engine; 11, 11 are the steerable front wheels; 12, 12 are front wishbone type suspensions for said wheels; 13 is the swash plate pump which is directly driven by the engine; 14 is a pressure-responsive servo-cylinder which actuates the capacity adjustment mechanism of said pump; 15 is the housing of a metering valve which is directly responsive to engine speed and admits pressure to the said servo-cylinder 14 as a tapping from pump delivery; 16, 16 are the swash plate motors associated one with each front wheel; 17, 17 are pressure responsive servo-cylinders which are associated one with each swash plate motor and actuate the capacity adjustment mechanism thereof; 18, 19 are the high pressure line and low pressure line, respectively, between the swash plate pump 13 and the two swash plate motors 16, 16 and associated servo-cylinders 17, 17; 20 is a change-over valve included in the pipe lines 18, 19, and 21 is the vehicle chassis.

With this arrangement, it will readily be appreciated that the combined capacity of the motors over that of the pump will represent the speed reduction at the road wheels.

Referring now more particularly to Fig. 2, in which like reference numerals to those in Fig. 1 represent like or analogous parts, the pump swash plate 22 has a control spring 23 operating to load it toward maximum angle, and opposing the control spring 23 is the servo-cylinder 14 with associated damping mechanism which is represented by a dash pot 24.

Pressure fluid to the servo-cylinder 14 is carried by a pipe 25 extending from one end of a valve chamber 26 within the valve housing 15, said chamber 26 containing a metering valve in the form of an endwise slidable double-ended needle valve 27 carried at the inner end of a stem 28 which extends outside the housing 15 at the opposite end to the servo supply pipe 25. The needle valve 27 controls a central opening in a trans-axial dividing wall 29 in the valve chamber. Pressure fluid from a tapping 30 from pump delivery is admitted via a passage 31 to that part of the metering valve chamber 26 in which the stem 28 is located.

An engine-speed sensitive governor 32, of the centrifugal weight type or any other type, acts upon the metering valve stem 28 to move it in proportion to engine speed. With the engine at rest the free end portion of the double-ended needle valve is located in the opening in the trans-axial dividing wall 29, as shown, so that as the valve 27 moves inwardly, as the engine accelerates from rest, the pressure metered to the servo-cylinder 14 gradually decreases to a minimum as the effective valve aperture area decreases. Thereafter further inward movement of the valve 27 resulting from further increases in engine speed, gradually increases the effective valve aperture, thus increasing the pressure metered to the servo-cylinder 14.

Thus it will be seen that in different positions of its overall travel, which represents a range of engine speeds, the metering valve 27 will give the same valve aperture area and consequently the same swash plate angle for any given system pressure, the system mechanism being so designed that the pump swash plate angle automatically set by the servo-cylinder 14 is at, or approximates as near as possible to, the theoretically most efficient angle for the prevailing pressure (torque) conditions in the transmission in accordance with the discovery explained above.

A restricted or bleed-off passage 33 from that portion of the valve chamber 26 between the dividing wall 29 and the mouth of the servo-cylinder supply pipe 25 communicates with a low pressure chamber 34 in the valve housing and is connected by an external tapping 35 with the low pressure side 19 of the system, to provide the return flow path for the metering fluid.

The invention so far described is based on the discovery that for any given fixed pressure in the system, the theoretically most efficient swash plate angle is substantially identical for two different rates of pump speed. For example, for a load condition producing 1000 p.s.i. pressure, the theoretically most efficient swash plate angle is the same, say 9.5°, when the pump is operating either at 500 r.p.m. or at 1860 r.p.m. It will be apparent that at 1860 r.p.m. a different load condition may produce only 700 p.s.i. pressure in the system and thus at this speed another theoretically most efficient angle will be required for the swash plate. This angle is substantially the same angle required at 500 r.p.m. with a load condition also producing 700 p.s.i.

Viewed differently, assume that at 500 r.p.m. a given orifice opening is afforded and the pressure rises and falls with load conditions. Under these circumstances, the swash plate angle will vary in accordance with pressure change and it will be assumed that the orifice opening is such that the pressure delivered to the servo-cylinder is properly controlled to produce the theoretically most efficient angles for the varying pressures. Assume now that the pump is speeded up to 1860 r.p.m. and load conditions, as before, cause the system pressure to rise and fall while the pump speed remains constant. Under these circumstances it will be assumed that the metering valve 27 will have moved so that the rear end thereof produces the same orifice opening as the forward end of the valve did when the pump operated at 500 r.p.m. Now, whenever the pressure at the increased rate of pump speed is the same as the pressure at the lower speed, the swash plate will assume the same angle and this angle will vary exactly as it did at lower speeds in accordance with pressure changes brought about by load condition changes.

If the valve 27, instead of regulating the orifice opening when the pump is at the higher speed, merely opened the orifice completely, the swash plate angle would, in all likelihood, be changed as load conditions cause a change in pressure though the angle assumed by the swash plate would not necessarily be the most efficient angle for the prevailing load condition, i.e., pressure. However, in accordance with the invention the theoretically best swash plate angle can be more nearly matched with load conditions, i.e., pressure, by the provision of valve means for regulating the orifice opening so that for the same pressure at two different pump speeds the swash plate assumes the same angle, with that angle being the theoretically most efficient angle for any predetermined pump speeds and system pressures.

The valve housing 15 contains a second valve 36 for over-riding the metering valve 27 under conditions of excess pressure in the pump delivery, as may arise from violent acceleration, said second valve 36 being a spring-loaded piston valve which operates, under excess pump delivery pressure and against its spring loading, to block the escape of metering fluid to the low pressure side of the system via the bleed passage 33, thus allowing high pressure to operate directly on the servo-cylinder 14 and actuate same to reduce the pump swash plate angle and thereby relieve the pressure build-up and avoid the possibility of hydraulic lock in the system.

The valve housing 15 also contains a third valve 37 which controls the high pressure inlet passage 31 to the metering valve 27. This third valve 37 is a spring-loaded piston valve, its spring 38a holding the valve in its open position against the low pressure. Thus a reversal of pressure between the low and high pressure sides of the system is necessary to operate said valve 37 and block the flow through the tapping 30 to the metering valve 27. Such a pressure condition is likely to occur when the vehicle is descending hills and "over-running" conditions arise with the wheel motors acting as pumps, and this "over-running" valve 37 therefore provides an increased degree of engine braking by effecting a reduction of pump swash plate angle in allowing a pressure build-up to reach the pump servo-cylinder 14 through passages 35 and 33.

The swash plate motors 16 are also of variable stroke, the swash plate angle of each being altered automatically by its servo-cylinder 17 according to pressure (torque) conditions in the system, but the motor servo-cylinders 17 operate in opposite sense to the pump servo-cylinder 14 in that the motor servo-cylinders 17 are actuated directly by increasing pressure prevailing in the pressure side of the circuit, in the vicinity of the motors, to increase the angle of the motor swash plate 38 against a spring 39 and damping mechanism represented by a dash pot 40.

It will be appreciated that the vehicle transmission above described provides a front wheel drive of constant angular velocity and with full differential action, and the incorporation of automatic pump swash plate angle variation inversely as the pressure (torque) in the system, coupled with automatic motor swash plate angle variation directly as the pressure, enables the minimum pump size to be utilised for a given duty. Further, the system affords an automatic "over-drive" effect and thus provides an infinitely variable velocity ratio drive over a far wider range than is normally obtainable.

Having started the engine and released the handbrake, opening of the throttle causes the engine to speed up and the pump swash plate angle increases until stopped by the servo-cylinder 14 at a suitable pre-determined pump delivery pressure, the vehicle commencing to move and accelerate.

On reaching a cruising speed the throttle opening is reduced to maintain said speed. At constant road speed the pump swash plate 22 operates at a setting giving a pump piston stroke determined by the reduced pressure requirement, causing automatic decrease of the angle of the motor swash plates 38. This puts up the pressure requirements which will tend to increase the angle of the motor swash plates 38 again, but that would again decrease the pressure, so that stability at crusing speed is reached at the most efficient pump and motor swash plate angles for the speed and torque. The reduced motor swash angle and constant road speed reduces the pump output required, which slows up the engine 10 until the throttle is opened for acceleration and prolonged cruising conditions can result in over-drive conditions being attained in the system.

Upon reduction of throttle opening for deceleration, the engine and pump speeds drop below requirements but the pump swash plate 22 is moved to reduced stroke by the action of the over-running valve 37 and servo-cylinder 14. The wheel motor swash plates 38 are at a small angle due to low input pressure, and the wheel motors 16 act as pumps and feed the pump 13 which tends to drive the engine 10 through an effectively high speed ratio with good braking effect.

When the vehicle is ascending a hill the wheel speed tends to drop and with it the motor speed. The increasing torque (pressure rise) automatically increases the swash plate angle of the motors 16, giving a gear reduction in the drive transmission.

Increase of throttle opening with further pressure rise adjusts the pump swash plate angle, through the metering valve 27 and servo-cylinder 14, to give maximum efficiency of operation for prevailing conditions of speed and torque.

The metering valve with its automatic adjustment of pump swash plate angle, together with the automatic motor swash plate adjustment, obviates the necessity in the system for wasteful by-passing direct from pressure to exhaust, which disadvantage is so usual in known hydraulic transmissions of this kind, where pump output so frequently exceeds motor capacity even during normal operation, the present invention providing a drive transmission in which pump output and motor capacity are maintained substantially balanced to each other and in which the pump and motors are operating at or near maximum efficiency for all engine speed and torque conditions prevailing over the whole range of vehicle operating conditions.

It will be appreciated that the metering valve need not necessarily be a double-acting needle valve, as other forms of valve could be designed to operate in the required manner.

Having fully described my invention, what I claim and desire to secure by Letters Patent is:

1. A hydraulic drive transmission comprising in combination an engine-driven pump having inlet and delivery sides and mechanism for varying pump capacity, a motor driven by said pump delivery, a pressure responsive servo-cylinder having a fluid connection with the pump delivery and operatively connected to said mechanism for determining pump capacity in the sense that increased servo-cylinder pressure reduces pump capacity, valve aperture means in said fluid connection, valve means movable with respect to said aperture means for metering the pressure admitted to said servo-cylinder from said pump delivery, speed responsive means connected to said valve means for moving it with respect to said aperture in response to engine speed, said valve means being movable between two limits of maximum aperture opening and an intermediate position of maximum aperture closure so that the same aperture opening occurs at different positions of the valve means in its travel and the pump capacity adjustment is effected accordingly, a bleed-off conduit having one end interposed between said valve and said servo-cylinder and its opposite end connected to the inlet side of said pump to provide a return flow of metering fluid to said pump, and a second normally open valve in said bleed-off passage responsive to sudden increase of pump delivery pressure to close said bleed-off passage when said pressure rises above a pre-set maximum and thereby effect an intensification of servo-pressure and consequent reduction of pump capacity.

2. The invention as set forth in claim 1 wherein the motor driven by said pump is of the variable capacity type with a return fluid connection with said bleed-off passage and the inlet side of said pump, said motor being mounted to drive a wheel of a vehicle, capacity adjustment mechanism associated with said motor, a servo-cylinder associated with said motor and operatively connected to said capacity adjustment mechanism for automatically actuating the same in opposite sense to that of the pump, said motor servo-cylinders having a direct fluid connection with the pump delivery so as to be actuated in response to the delivery pressure obtaining in the vicinity of its associated motor, and a normally open third valve interposed between said metering valve and said pump delivery and subjected to the pressure prevailing in the inlet side of said pump, said valve being movable to closed position by increased pressure on the inlet side of said pump resulting from over-running of the vehicle wheels and consequent drive of said motor to act as a pump, said valve in closed position blocking flow of delivery pressure through said metering valve to said pump servo-cylinder so that excess inlet pressure may flow through said bleed-off passage to the servo-cylinder of said pump and actuate the pump adjustment mechanism in the sense to reduce pump capacity and enhance the braking effect of said pump.

3. A hydraulic drive transmission of the type referred to and as applied to the transmission of a motor vehicle's wheels in combination, an engine-driven pump including inlet and outlet lines with mechanism for varying pump capacity, variable capacity motors driven by the pump and mounted to drive said vehicle wheels, a pressure responsive pump servo-cylinder for adjusting said mechanism to determine pump capacity, in the sense that increased pump servo-cylinder pressure reduces pump capacity, a fluid connection having an orifice therein between said pump outlet line and said servo-cylinder, an engine speed sensitive governor, a double-ended needle valve movable axially in said orifice by said governor to vary the effective area of said orifice to control the pressure admitted to the pump servo-cylinder from the pump delivery, so that during the full stroke of the valve in either direction the effective area of said orifice will progressively decrease to a minimum and then increase so as to give the same effective metering orifice for different engine speeds and affect the pump capacity adjustment accordingly, a metering fluid outlet duct having one end interposed between said metering valve and said servo-cylinder and having its opposite end connected to the inlet line, a second normally open valve responsive to pump delivery pressure so as to close said outlet duct upon excessive pump delivery pressure and thereby effect an intensification of pump servo pressure and consequent reduction of pump capacity, motor capacity adjustment mechanism associated with each wheel driving motor, motor servo-cylinders associated one with each motor for actuating the motor capacity adjustment mechanisms thereof automatically in opposite sense to that of the pump, each motor servo-cylinder being connected to said outlet line so as to be subjected directly to pump delivery pressure obtaining in the vicinity of its associated motor, and a third valve exposed to pump inlet pressure which, on pressure build-up in the inlet line due to over-running and the tendency for the wheel driving motor to act as pump operates to close the outlet line from pump delivery to the double-ended metering valve and allow said pressure in the inlet line to build up in the pump servo-cylinder and actuate the pump adjustment mechanism in the sense to reduce pump capacity and enhance the braking effect of the pump.

References Cited in the file of this patent

UNITED STATES PATENTS

| | | |
|---|---|---|
| 1,779,757 | Streckert | Oct. 28, 1930 |
| 2,161,439 | Thoma | June 6, 1939 |
| 2,343,386 | Poitras et al. | Mar. 7, 1944 |
| 2,629,332 | Tripp | Feb. 24, 1953 |

FOREIGN PATENTS

| | | |
|---|---|---|
| 605,386 | Germany | Nov. 9, 1934 |